June 18, 1968 N. A. WAAG 3,388,919
TOTE CART FOR LEAVES AND THE LIKE
Filed Oct. 5, 1966 2 Sheets-Sheet 1
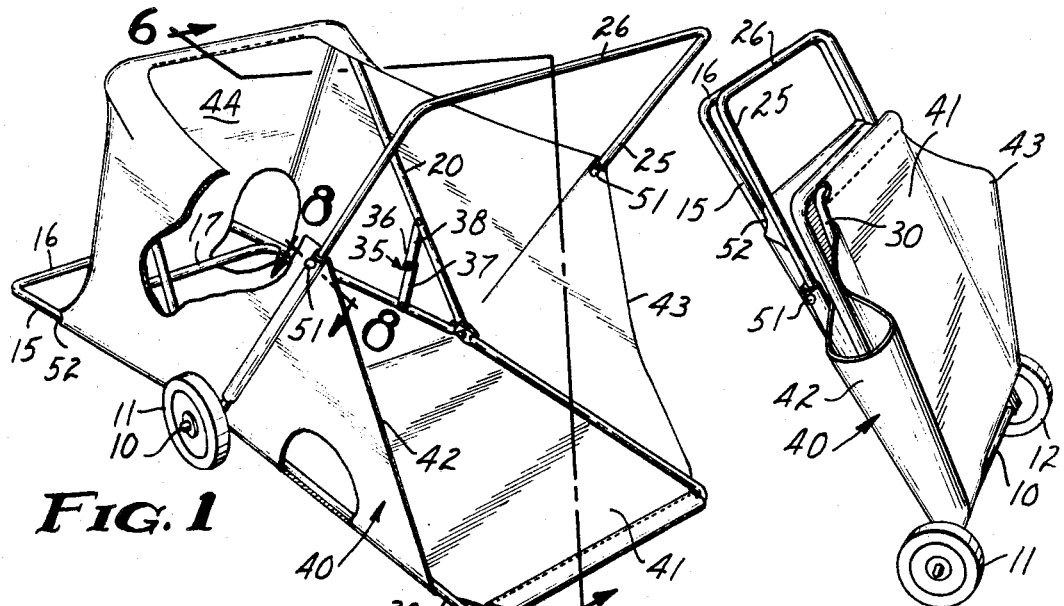
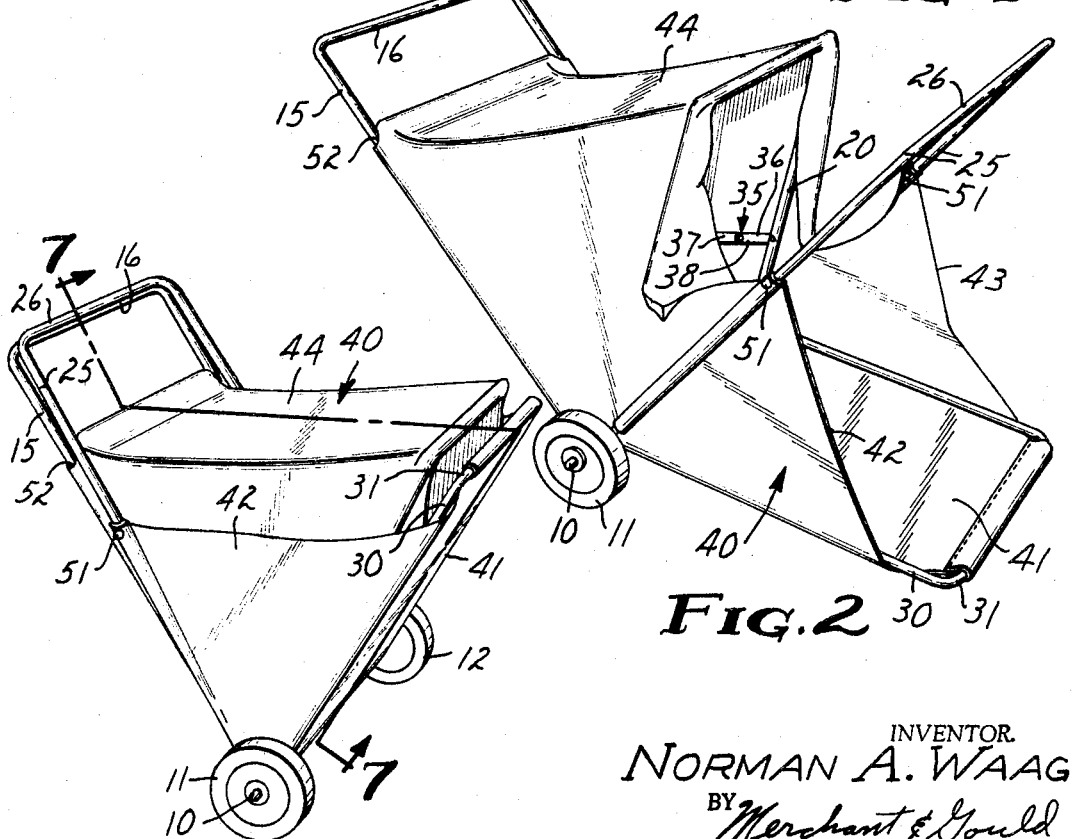
INVENTOR.
NORMAN A. WAAG
BY Merchant & Gould
ATTORNEYS June 18, 1968  N. A. WAAG  3,388,919
TOTE CART FOR LEAVES AND THE LIKE
Filed Oct. 5, 1966  2 Sheets-Sheet 2

INVENTOR.
NORMAN A. WAAG
BY Merchant & Gould
ATTORNEYS

United States Patent Office 3,388,919
Patented June 18, 1968

3,388,919
TOTE CART FOR LEAVES AND THE LIKE
Norman A. Waag, Minneapolis, Minn., assignor to Allstate-Campbell, Inc., Minneapolis, Minn., a corporation of Minnesota
Filed Oct. 5, 1966, Ser. No. 584,569
5 Claims. (Cl. 280—36)

ABSTRACT OF THE DISCLOSURE

An axle having a wheel mounted at each end thereof and four U-shaped frame members radiating outwardly therefrom and pivotally attached thereto with a flexible covering attached therebetween. The frame is foldable into three configurations, an open configuration for receiving bulky material, a closed configuration for transporting the bulky material and a storage configuration. In the open configuration, two of the frame members radiate outwardly approximately 180° apart with the other two frame members in a spaced apart position therebetween and the flexible covering forms a relatively flat bottom with an end and two side walls. In the closed configuration, the device forms a substantially enclosed chamber around the leaves. In the storage configuration all of the frame members are substantially parallel and in juxtaposition.

---

This invention pertains to a vehicle for transporting bulk material, such as leaves and the like, and more particularly to a vehicle having a foldable frame and flexible covering thereover so that the frame can be opened to receive the leaves and the like therein, after which the frame is folded to form a substantially closed chamber therein, and, when not in use, the frame and flexible covering can be folded into a small compact unit for storage.

It is an object of the present invention to provide a new and improved tote card for leaves and the like.

It is a further object of the present invention to provide a tote cart which is foldable into three configurations, an open configuration for receiving leaves and the like therein, a closed configuration for transporting the leaves and the like, and a storage configuration.

It is a further object of the present invention to provide a tote cart which is easy to load and which can transport the leaves and the like without spreading them around, even on a windy day.

It is a further object of the present invention to provide a tote cart which is simple and inexpensive to produce.

These and other objects of this invention will become apparent to those skilled in the art upon consideration of the accompanying specification, claims, and drawings.

Referring to the drawings, wherein like characters indicate like parts throughout the figures:

FIGURE 1 is a perspective view of the present device in the open configuration, parts thereof broken away and shown in section;

FIGURE 2 is a perspective view of the present device partially folded into the closed configuration;

FIGURE 3 is a perspective view of the present device in the closed configuration;

FIGURE 4 is a view of the present device in the storage configuration;

Figure 5:
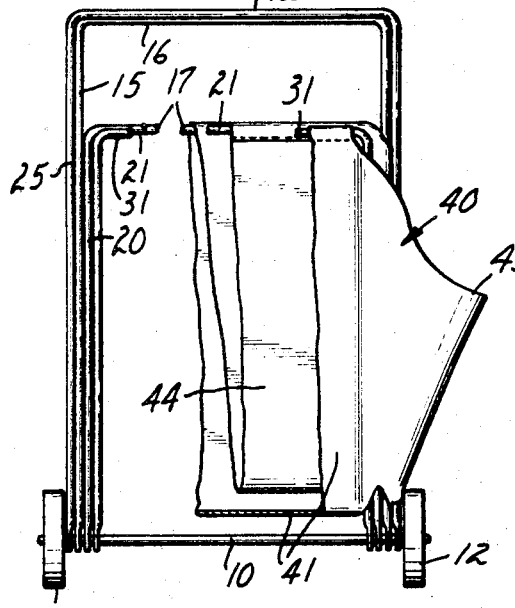
FIGURE 5 is a front view of the present device in the storage configuration, parts thereof broken away and shown in section.
Figure 7:
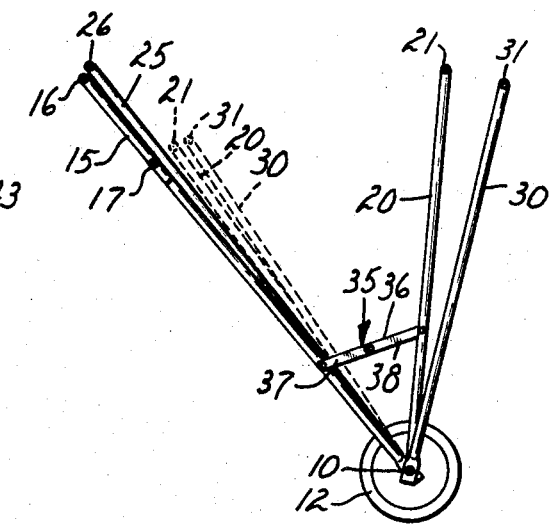
FIGURE 7 is a sectional view as seen from the irregular line 7—7 in FIGURE 3.
Figure 6:
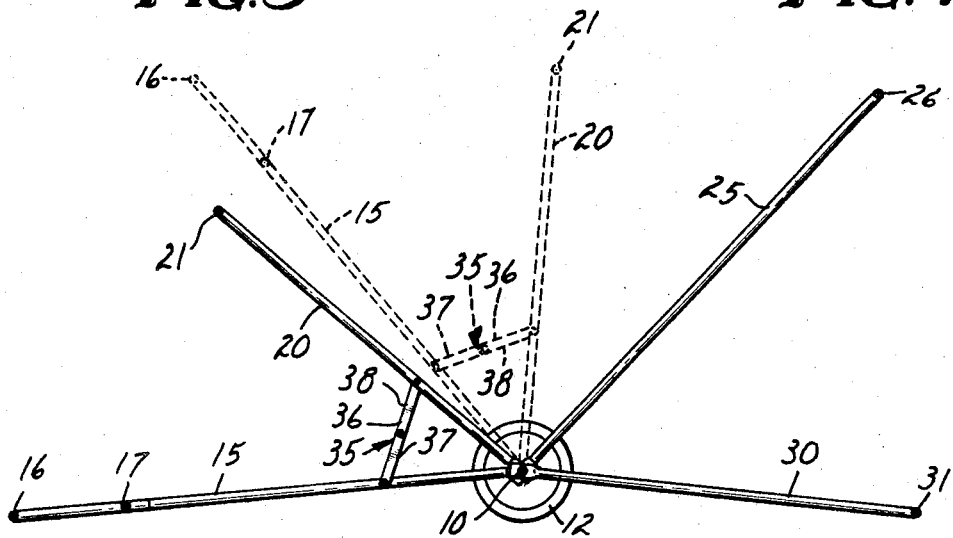
FIGURE 6 is a sectional view as seen from the irregular line 6—6 in FIGURE 1.

In the figures the numeral 10 generally designates an axle having wheels 11 and 12 rotatably mounted at the ends thereof. The axle 10 acts as an axis of rotation for the frame of the tote cart as well as a means for supporting and transporting the tote cart. A first generally U-shaped frame member 15 has a hole through both ends thereof transverse to the longitudinal axis, and is rotatably mounted on the axle 10 by means of the holes. The bight of the U-shaped member 15 is designated 16 and serves as a handle for the tote cart. The U-shaped member 15 has a cross piece 17 extending between the arms thereof parallel to the bight 16 and spaced therefrom. A second U-shaped frame member 20 has a hole through both ends with the axle 10 passing therethrough to rotatably mount the member 20 about the axle 10. The U-shaped member 20 has a bight 21 which is spaced from the axle 10 to approximately the same distance as the cross piece 17 of the U-shaped member 15. The ends of the U-shaped member 20 are engaged over the axle 10 adjacent the ends of the U-shaped member 15, but spaced inwardly therefrom. A third frame member 30 has holes through both ends thereof and the axle 10 is engaged therethrough to rotatably mount the member 30. The third frame member 30 has a bight 31 spaced from the axle 10 a distance approximately equal to the distance of the bight 21 of the frame member 20 from the axle 10. The ends of the frame member 30 are engaged over the axle 10 adjacent the ends of the frame member 20 but spaced inwardly therefrom. A fourth U-shaped frame member or handle 25 has holes through both ends thereof and the axle 10 engaged therein to rotatably mount the U-shaped member 25 therearound. The U-shaped member 25 has a bight 26 which is spaced from the axle 10 a distance approximately equal to the distance of the bight 16 of the U-shaped member 15 from the axle 10. The ends of the U-shaped member 25 engaged over the axle 10 are positioned adjacent the ends of the U-shaped member 15, but spaced outwardly therefrom.

Each of the U-shaped frame members 15, 20, 25, and 30 are constructed of a hollow tubular material in this embodiment to provide the frame with the required strength and to maintain the frame relatively light. It should be noted however that other materials might be utilized for the frame members 15, 20, 25, and 30 and the resulting device would still be within the scope of this invention. Also, it should be noted that the various frame members 15, 20, 25 and 30 might be formed in somewhat different configurations and, in some instances, a frame member might actually be eliminated but all of these embodiments come within the scope of this invention. In the present embodiment, the frame member 25 is rotatable past the frame member 20 and into juxtaposition with the frame member 15. Also, the frame members 15 and 20 operate as a first pair and as such are normally maintained in a spaced relationship by collapsible means generally designated 35. The collapsible means 35 includes a pair of devices, only one of which can be seen in the drawings and is designated 36, operatively mounted between each of the arms of the frame member 15, and each of the arms of the frame member 20. Since both of the devices of the collapsible means 35 are similar, only the device 36 will be described in detail. The device 36 includes a pair of linking member 37 and 38 pivotally attached together at one end for relative rotation only in a single direction. The free end of the linking member 38 is pivotally attached to the arm of the frame member 20 and the free end of the linking member 37 is pivotally attached to the arm of the frame member 15. Since the two pivotally connected ends of the members 37 and 38 only rotate in one direction when the members 37 and 38 are parallel, or longitudinally aligned, the device 36 fixedly maintains the pair of frame members 15 and 20 in an angularly spaced apart relationship. However, by moving the pivotally connected ends of the members 37 and 38 so as to rotate the members 37 and 38 relative to each other, the frame members 15 and 20 can be pivoted together into the storage configuration. It should be understood that the collapsible means 35, which is illustrated in the drawings, is one embodiment of apparatus for maintaining the frame members 15 and 20 normally in an angularly spaced apart relationship and many other devices could be utilized which would be within the scope of this invention.

Figure 8:
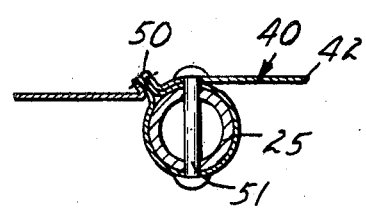
FIGURE 8 is a sectional view as seen from the line 8—8 in FIGURE 1.

A flexible covering generally designated 40, which may consist of any suitable material such as canvas, plastic, etc., is fixedly attached to the frame members 15, 20, 25, and 30 in the following manner. The flexible covering 40 is formed into a generally scoop-like configuration having a generally flat bottom 41, two substantially similar generally vertical sides 42 and 43, and a rear end 44. The flexible covering 40 is formed and attached to the frame members 15, 20, 25, and 30 so that members 15 and 30 radiate from the axle 10 in approximately opposite directions, the frame member 20 is angularly spaced from the member 15 approximately 45 degrees and the frame member 25 is angularly spaced from the frame member 30 approximately 45 degrees. Actually, the frame members 15 and 30 are slightly greater than 180 degrees apart because the bights 16 and 31, respectively, are adapted to lie on the ground when the cart is in the open configuration while the ends attached to the axle 10 are spaced from the ground the radius of the wheels 11. It should be understood that while the bottom 41 of the flexible covering 40 actually has a slight bow therein, for convenience in this description, it will be referred to as generally flat or substantially horizontal. With the various frame members in the open configuration, the flexible covering 40 is stretched thereover so that the cross piece 17 of the frame member 15 and the remainder of the arms extending inwardly toward the axle 10 are positioned within the flexible covering 40 and the entire frame members 20 and 30 are positioned within the flexible covering 40. The frame member 25 is positioned outside of the flexible covering 40. The extreme front end of the bottom 41 is folded over to encircle the bight 31 of the frame member 30 and is sewn along the edge to maintain it fixedly in position. The sides 42 and 43 of the flexible covering 40 angle upwardly from adjacent the front end thereof to the frame member 25. To attach the flexible covering 40 to the frame member 25, a fold 50 is made in each of the sides 42 and 43 approximately parallel with the arms of the frame member 25. The fold 50 is then turned to encircle the arms of the frame member 25 and sewed to maintain it in this position, as illustrated in FIGURE 8. In addition, a rivet 51 is engaged through holes in the side 42 and the arm of the frame member 25 encircled thereby, as illustrated in FIGURES 1 and 8, to prevent the side 42 from sliding longitudinally down the arm of the frame member 25. A rivet, also numbered 51, is likewise engaged through the side 43 and the other arm of the frame member 25 in a similar fashion. The corner of the flexible covering 40 formed by the junction of the bottom 41 and the rear end 44 is engaged over the cross piece 17 attached to the frame member 15. The bight 16 and the portion of the arms between the bight 16 and the cross piece 17 form a handle, which extends outside of the flexible covering 40. An opening 52 is formed at either corner, produced by the junction of the sides 42 and 43 with the rear end 44 and the bottom 41, to allow the arms of the frame member 15 to extend therethrough. The upper edge of the rear end 44 is folded to encircle the bight 21 of the frame member 20 and sewed to maintain it fixedly in place. In this embodiment the flexible covering 40 is constructed from a plurality of pieces sewn together to make the entire cover. The particular seams, etc. where the various pieces are sewn together are not shown because it is not a part of this invention, and the shapes of the various pieces are purely discretionary with the producer.

The position of the various members described in conjunction with the shape of the flexible covering 40 is the open configuration, illustrated in FIGURE 1, in which the cart is adapted to receive leaves and the like therein. After the cart is full, or whenever desired, the cart may be folded into the closed configuration, illustrated in FIGURE 3, by grasping the handle, bight 16 of frame member 15, and moving the frame member 15 to an angle of approximately 45 degrees with the ground, as illustrated in FIGURE 2, and rotating the frame member of handle 25 past the frame member 20 into juxtaposition with the frame member 15. Because of the position of the various frame members and the shape of the flexible covering 40, the portion of the side walls 42 and 43 between the frame members 20 and 25 folds to allow the frame member 25 to rotate past the frame member 20. In the closed configuration the bottom 41 of the flexible covering 40 is folded into a generally V-shape and the rear end 44 acts as a cover to form a substantially closed chamber therein and prevent the material being carried therein from blowing out or otherwise being undesirably spread around. When the cart is not being used, the collapsible means 35 can be folded to allow the frame member 20 to rotate into juxtaposition with the frame member 15 and the frame members 25 and 30 can also be rotated into juxtaposition therewith. With all of the various members rotated into juxtaposition the cart is in a storage configuration and forms a compact structure which is convenient and easy to store. Thus, the present cart can be quickly and easily placed in the open configuration to receive leaves and the like therein after which the various members can be rotated to the closed configuration to transport the leaves easily with no danger of spreading them around. When the cart is not in use it can be folded into the compact storage configuration in which it takes up very little space and can be easily stored.

While I have shown and described a specific embodiment of this invention, further modification and improvements will occur to those skilled in the art. I desire it to be understood, therefore, that this invention is not limited to the particular form shown and I intend in the appended claims to cover all modifications which do not depart from the spirit and scope of this invention.

I claim:

1. A tote cart for leaves and the like comprising:
   (a) a plurality of frame members pivotally attached for relative rotation about an axis including a pair of members extending radially outwardly from the axis in angularly spaced apart relationship and a third member extending radially outwardly from the axis in a direction generally opposite to one of the pair of members;
   (b) flexible covering means attached to said frame members for allowing said frame members to rotate into an open configuration wherein the portion of the flexible covering means attached to said pair of members forms a generally horizontal bottom, two generally vertical sidewalls and an end wall with the top and one end being opened to receive leaves and the like therethrough and the portion of the flexible covering means attached to said third member forms an extension of the generally horizontal bottom, a closed configuration wherein said third member rotates into juxtaposition with one of said pair of members and said portion of the covering means attached thereto forms a substantially closed chamber in cooperation with said portion of the covering means attached to said pair of members, and a storage configuration; and
   (c) a plurality of wheels rotatably attached relative to said frame members for movement of said frame members across a surface.

2. A tote cart for leaves and the like as set forth in claim 1 wherein each of the third member and the pair of members has a handle associated therewith which handles are moved into juxtaposition when the frame members are rotated into the closed configuration.

3. A tote cart for leaves and the like comprising:
 (a) a plurality of frame members pivotally attached for relative rotation about an axis including four members which in the open configuration radiate outwardly from the axis in angularly spaced apart positions and in the closed configuration form two angularly spaced apart pairs of members with each of said pairs including two juxtapositioned frame members;
 (b) a plurality of wheels rotatably attached relative to said frame members for movement of said frame members across a surface; and
 (c) flexible covering means attached to said frame members for allowing said frame members to rotate into an open configuration in which said covering means forms a scoop-shaped structure, a closed configuration in which said covering means forms a substantially closed chamber and a storage configuration.

4. A tote cart for leaves and the like as set forth in claim 3 wherein each of the four frame members is rotatably attached to the axis so that at least one of said frame members can rotate about the axis past another of said frame members to form the two angularly spaced apart pairs of members.

5. A tote cart for leaves and the like comprising:
 (a) an axle having a wheel rotatably mounted at either end thereof;
 (b) first and second generally U-shaped frame members pivotally attached to said axle adjacent both ends of each of said frame members;
 (c) collapsible means connected between said first and second frame members for normally maintaining said frame members angularly separated to radiate from said axle along separate radii and allowing said frame members to rotate into substantially equal radii upon collapse thereof;
 (d) third and fourth generally U-shaped frame members pivotally attached to said axle adjacent both ends of each of said third and fourth frame members; and
 (e) flexible covering means attached to said first, second, third and fourth frame members to allow said frame members to pivot into angularly separated positions in which said first and third frame members extend generally horizontally outwardly in opposite directions from said axle and said second and fourth frame members are positioned at intermediate angles therebetween, said flexible covering forming a generally scoop-shaped structure having a bottom, two sides and an end when said frame members are in said angularly separated positions and said flexible covering forming a substantially closed chamber when said first and fourth frame members and said second and third frame members are rotated into juxtaposition.

References Cited
UNITED STATES PATENTS

| | | | |
|---|---|---|---|
| 2,992,011 | 7/1961 | Becan | 280—36 |
| 3,106,303 | 10/1963 | Finocchiaro | 280—36 |

BENJAMIN HERSH, *Primary Examiner.*

R. SONG, *Assistant Examiner.*